(12) United States Patent
Michel

(10) Patent No.: US 6,227,549 B1
(45) Date of Patent: May 8, 2001

(54) INSULATED CHUCK JAW

(75) Inventor: Timothy P. Michel, Naperville, IL (US)

(73) Assignee: S-B Power Tool Company, Chicago, IL (US)

(*) Notice: Subject to any disclaimer, the term of this patent is extended or adjusted under 35 U.S.C. 154(b) by 0 days.

(21) Appl. No.: 09/510,005

(22) Filed: Feb. 22, 2000

(51) Int. Cl.[7] ................................... B23B 31/12
(52) U.S. Cl. .................. 279/60; 279/43.6; 279/46.6; 279/152; 279/125; 81/421; 269/274; 408/240
(58) Field of Search ............... 279/60–65, 43.6, 279/46.6, 123, 152, 902, 151, 125; 408/240; 81/421–423; 269/274

(56) References Cited

U.S. PATENT DOCUMENTS

| | | | |
|---|---|---|---|
| 2,788,216 | * 4/1957 | Chasar | 279/151 |
| 3,242,998 | 3/1966 | Gubbins . | |
| 3,606,968 | * 9/1971 | Loyd | 279/151 |
| 3,685,843 | 8/1972 | Jacyno | 279/1 |
| 3,751,052 | 8/1973 | Derbyshire | 279/18 |
| 3,797,960 | 3/1974 | McCarthy | 408/240 |
| 3,910,589 | 10/1975 | Derbyshire | 279/61 |
| 4,975,004 | 12/1990 | Sharpe | 408/238 |
| 5,219,174 | 6/1993 | Zurbriigg et al. | 279/82 |
| 5,340,128 | * 8/1994 | Weiss et al. | 279/60 |

FOREIGN PATENT DOCUMENTS 672403   10/1964   (IT) .

* cited by examiner

Primary Examiner—Steven C. Bishop
(74) Attorney, Agent, or Firm—Greer, Burns & Crain, LTD

(57) ABSTRACT

A chuck jaw that is configured and arranged to be used in combination with other chuck jaws for securely retaining a rotatable accessory, such as a drill bit, in position in a chuck assembly, where the chuck jaw includes a chuck jaw body that defines a generally longitudinal axis along the primary extension direction thereof and a chuck jaw tip that is positioned within the chuck jaw body and extends along at least a portion of the generally longitudinal axis of the chuck jaw body. The chuck jaw further includes an insulating material for preventing electrical current from passing between the rotatable accessory and the remainder of the chuck assembly via the chuck jaw.

23 Claims, 3 Drawing Sheets

INSULATED CHUCK JAW

The present invention relates generally to chuck jaws for use with a rotatable power tool, such as a drill, for securely retaining a rotatable accessory therein. More particularly, the present invention relates to an insulating chuck jaw that electrically insulates a rotatable accessory (such as a drill bit) from the chuck assembly, and therefore prevents electric current from being conveyed from the rotatable accessory to the user.

BACKGROUND OF THE INVENTION

Rotatable power tools, such as electric drills, are often used in situations where the rotatable accessory may come into contact with a source of electricity. For example, the drill bit of a power drill may sever a wire located within a wall, or the drill may even cut into its own cord. Accordingly, for the safety of the tool operator, it is important to prevent the electric current from reaching the operator.

One known method of preventing electric current from reaching the operator includes the use of an insulating housing with insulated hand grip areas. Another known method, which is described in U.S. Pat. No. 3,685,843 to Anthony Jacyno, involves the use of an insulating member that is positioned within a metal drill chuck, for preventing flow of electric current between the drill chuck and the rotating spindle. A similar type of insulating sleeve is also described in U.S. Pat. No. 3,797,960 to Donald J. McCarthy.

One problem with these known insulating methods is that there is still a danger of electric shock if the operator's hand or other body part contacts the chuck assembly while the rotatable accessory is in contact with the electrical wire. While these prior art insulating methods do insulate between the drill bit and the handle of the device, they usually fail to insulate between the drill bit and the chuck assembly (which holds the drill bit in position). Thus, the electric current is free to flow from the drill bit, to the chuck assembly, and then to the operator if, for example, the operator's hand makes contact with the chuck assembly, which is normally made of metal.

Accordingly, it is an object of the present invention to provide an improved rotatable power tool which provides insulated components therein for preventing electric current from being transferred from the rotatable accessory to the operator.

Another object of the present invention is to provide an improved chuck assembly which is insulated in such a manner that prevents electric current from being transferred from a rotatable accessory to the outer surface of the chuck assembly.

An additional object of the present invention is to provide an improved insulated chuck assembly that is inexpensive and can be utilized with existing chuck assembly configurations.

Yet another object of the present invention is to provide an insulating chuck jaw that can be used, in combination with other similar chuck jaws, in a chuck jaw assembly for providing superior electrical insulation therein.

These and other objects of the present invention will be apparent from the following detailed description of the invention, while referring to the attached drawings in which.

The above-listed objects are met or exceeded by the present invention, which provides an improved chuck jaw in a chuck assembly of a rotatable power tool that prevents electrical current from being transferred between a rotatable accessory and the operator, even if the operator makes contact with the outer surface of the chuck assembly. One of the main features of the present invention is an insulating chuck jaw that it intended to be used in combination with other similar insulating chuck jaws. Generally, the present invention consists of an insulating chuck jaw with a chuck jaw tip that is preferably made of metal and is configured to make secure contract with a rotatable accessory, such as a drill bit. The chuck jaw tip is at least partially surrounded by an insulating material such that electric current cannot be passed from the chuck jaw tip to the remainder of the chuck assembly.

More specifically, the present invention provides a chuck jaw that is configured and arranged to be used in combination with other chuck jaws for securely retaining a rotatable accessory in position in a chuck assembly, where the chuck jaw includes a chuck jaw body that defines a generally longitudinal axis along the primary extension direction thereof and a chuck jaw tip that is positioned within the chuck jaw body and extends along at least a portion of the generally longitudinal axis of the chuck jaw body. The chuck jaw further includes an insulating material for preventing electrical current from passing between the rotatable accessory and the remainder of the chuck assembly via the chuck jaw.

In a first preferred embodiment, the insulating material consists of a generally channel-shaped component that is situated between the chuck jaw tip and the chuck jaw body. In a second preferred embodiment the insulating material forms the majority of the chuck jaw body, and the chuck jaw tip is embedded, at least partially, therein.

DETAILED DESCRIPTION OF THE PREFERRED EMBODIMENTS

Figure 1:
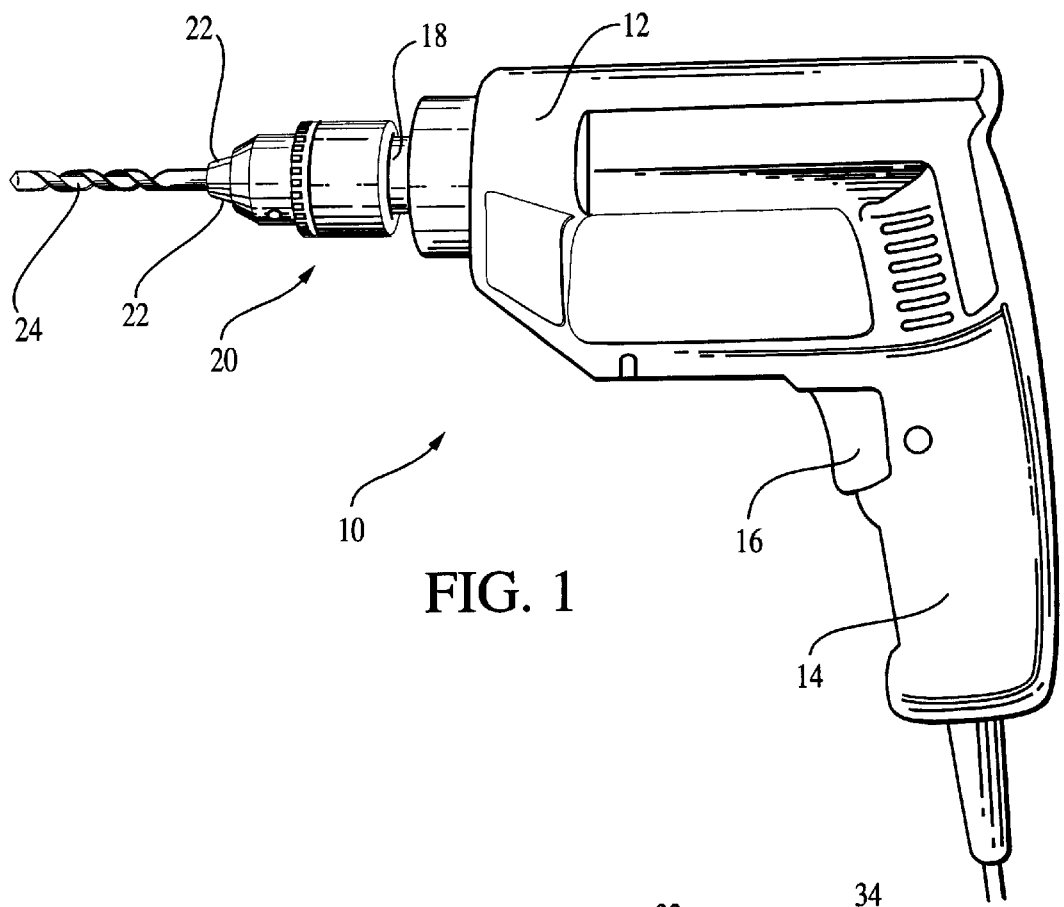
FIG. 1 is a side view of a rotatable power tool including therein several of the present insulating chuck jaws.

Referring now to the drawings, the first preferred embodiment of the present invention is shown in FIGS. 1–6, with FIG. 1 showing a power drill 10. Power drill 10 is one example of the type of rotatable power tool that may employ the present insulated chuck jaw. Briefly, the power drill 10 includes a housing 12, which is preferably made of plastic, that includes a handle portion 14 and an on/off trigger 16. Located within the housing 12 is a motor (not shown), which is connected to a rotatable shaft 18. The rotatable shaft 18 is further rotatably connected to a chuck assembly 20, which is still further rotatably connected to a drill bit 24. The drill bit 24 is secured in place within the chuck assembly 20 for rotation therewith via a plurality of chuck jaws 22.

To operate the drill 10, the user grips the handle 14 and presses the on/off trigger 16 to start rotation of the motor located within the housing 12. The motor rotates the rotatable shaft 18, the chuck assembly 22, and the drill bit 24 because all of these components are rotatably connected together.

Figure 2:
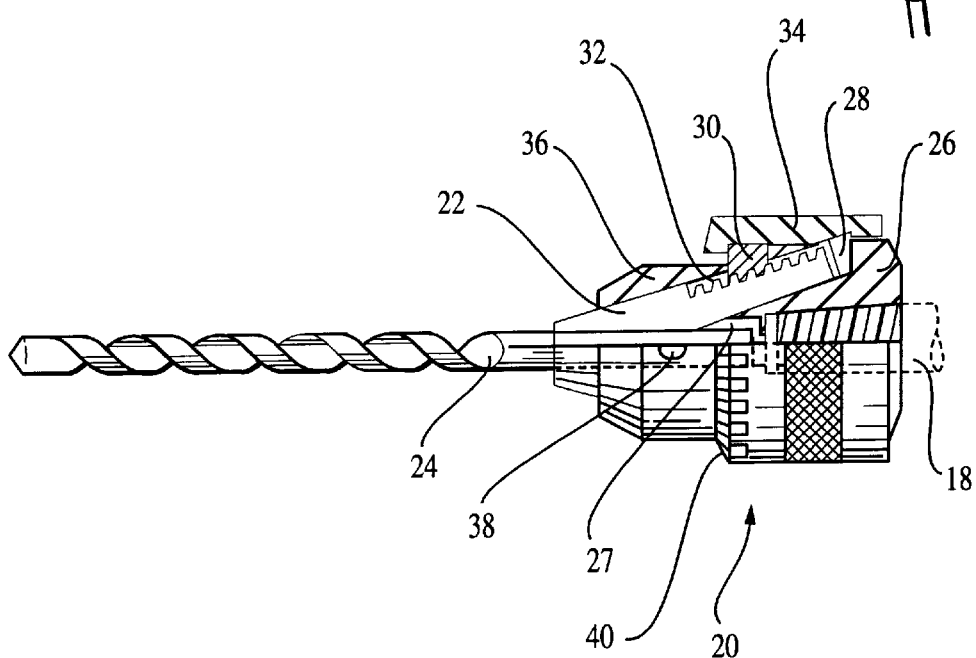
FIG. 2 is a partial cross-sectional view of a chuck jaw assembly including therein several of the present insulated chuck jaws.

Referring now to FIG. 2, a partially cut-away view of the chuck assembly 20 is shown. The rotatable shaft 18 is externally threaded so that it can be secured to internally threaded body part 26 for rotation therewith. The threaded body part 26 includes therein a central bore 27 for receiving the drill bit 24. The threaded body part 26 also includes a plurality of equally spaced bores 28, which are inclined toward the central bore 27. Preferably, the body part 26 includes three bores 28. One chuck jaw 22 is seated within each of the bores 28. An internally threaded nut 30 is configured to surround the chuck jaws 22. Each of the chuck jaws 22 includes a threaded portion 32 that extends along at least a portion of its outer periphery. The nut 30 is preferably formed in half to facilitate assembly around the chuck jaws 22, and a sleeve 34 is preferably used to retain the two halves of the nut in position.

The sleeve 34 and the nut 30 are configured to be rotatable together, such as via an interference fit or by having the nut 30 keyed into the sleeve 34. The threads of the nut 30 are configured to mate with the threads 32 of the chuck jaws 22. A chuck body 36 in the form of a tapered sleeve is positioned adjacent to the nut 30 and surrounds the chuck jaws 22.

As known to those skilled in the art, the chuck jaws 22 may be extended (for gripping the drill bit 24) or retracted (for releasing the drill bit) through the use of a ratcheted key (not shown) that can be inserted into a key port 38 that is recessed within the chuck body 36. More specifically, the key is rotated within the key port 38 such that the teeth located on the key contact the key ratchets 40 on the sleeve 34. When the key is rotated, the sleeve 34 rotates, which in turn causes the nut 30 to rotate, resulting in the extension or retraction of the chuck jaws 22 due to the threaded connection between the nut 30 and the threads 32 of the chuck jaws.

Figure 3:
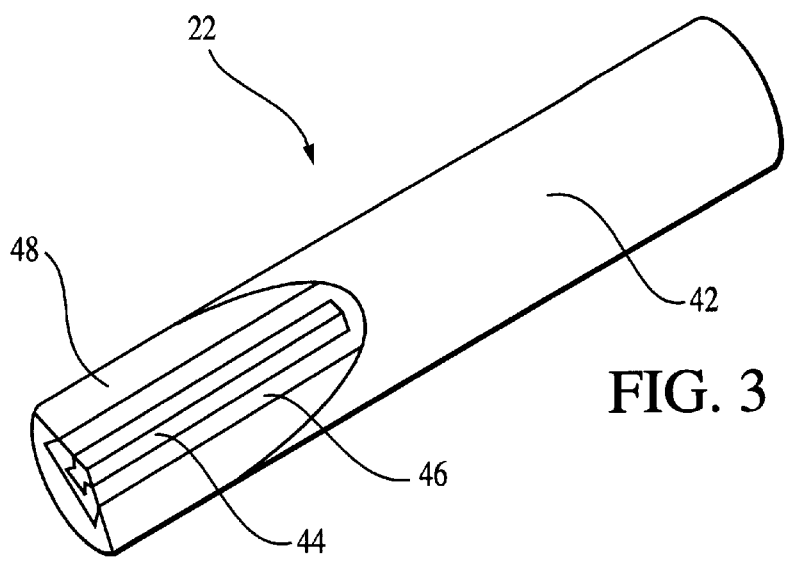
FIG. 3 is a perspective view of a first embodiment of the present insulating chuck jaw.
Figure 4:
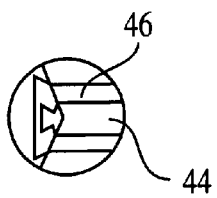
FIG. 4 is a front view of the longitudinal end of the first embodiment of the present insulating chuck jaw.
Figure 5:
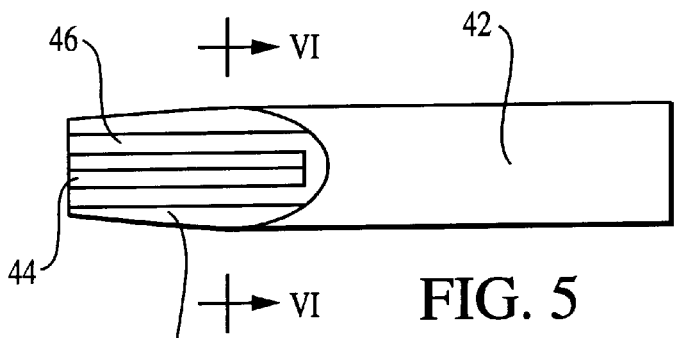
FIG. 5 is a side view of the first embodiment of the present insulating chuck jaw.
Figure 6:
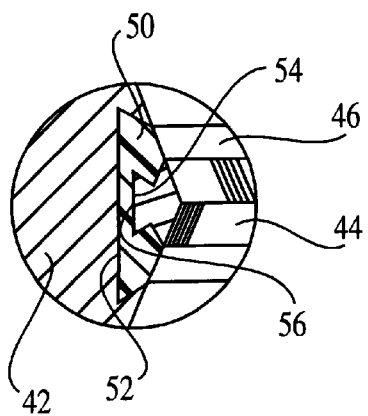
FIG. 6 is a cross sectional view of FIG. 5 taken along line VI—VI.
Figure 7:
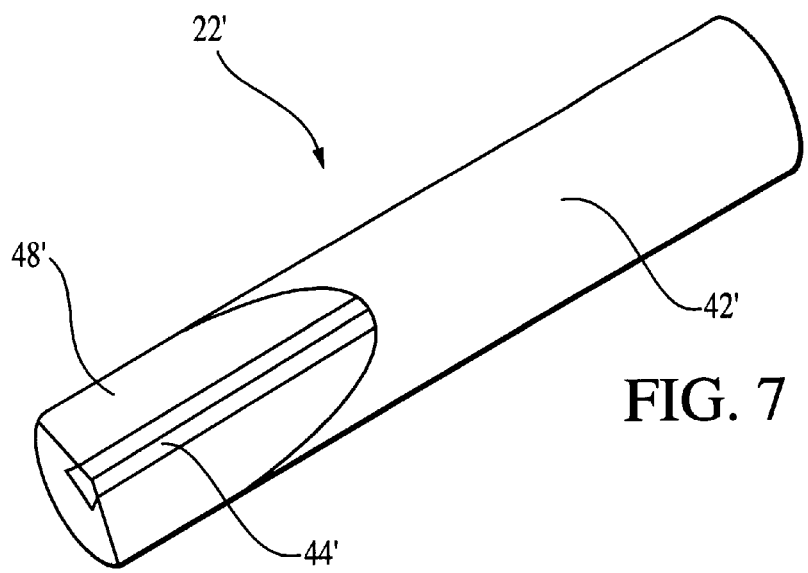
FIG. 7 is a perspective view of a second embodiment of the present insulating chuck jaw.
Figure 8:
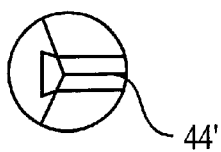
FIG. 8 is a front view of the longitudinal end of the second embodiment of the present insulating chuck jaw.
Figure 9:
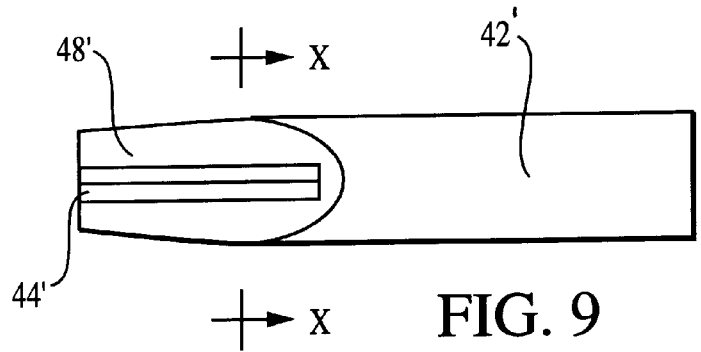
FIG. 9 is a side view of the second embodiment of the present insulating chuck jaw.
Figure 10:
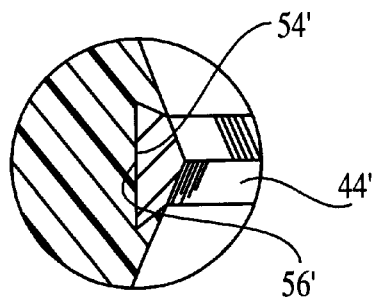
FIG. 10 is a cross-sectional view of FIG. 9 taken along line X—X.

One important aspect of the present invention is the configuration of the chuck jaws 22. Referring now to FIGS. 3–6, the configuration of a first embodiment of the chuck jaws 22 will now be described. As shown in FIG. 3, the chuck jaw 22 of this embodiment includes a chuck body jaw 42 and a chuck jaw tip 44. The chuck jaw body 42 includes a cutaway portion 48 which is peaked such that a generally V-shaped cross-section is formed, as can be seen in FIGS. 3, 4, and 6.

This embodiment also preferably includes a generally channel-shaped member 46 made of an insulating material such as plastic. Preferably, the chuck jaw body 42 and the chuck jaw tip 44 are both made of metal in order to provide sufficient strength to the chuck jaw 22. In the preferred embodiment, the chuck jaw tip 44 and the channel shaped member 46 extend the full length of the chuck jaw body 42. However, it is contemplated that the chuck jaw tip 42 and the channel-shaped member may terminate within the chuck jaw body 42 at a position just past the cutaway portion 48. For reasons that will become apparent, the chuck jaw tip 44 needs to be completely electrically insulated from the chuck jaw body 42. Accordingly, if the chuck jaw tip 44 does not extend the full length of the chuck jaw body 42, the insulating channel-shaped member 46 must include an end cap that prevents the end of the tip 44 from contacting the jaw body 42. Likewise, if the chuck jaw tip 44 does extend the full length of the chuck jaw body 42, the top of the tip 44 in the area past the cutaway portion 48 must be fully enclosed within the channel shaped member 46 to prevent contact between the tip 44 and the chuck jaw body 42.

The chuck jaw tip 44 is preferably adhesively bonded to the channel-shaped member 46, and the channel-shaped member 46 is preferably adhesively bonded to the chuck jaw body 42. In order to provide a more secure bond between the channel-shaped member 46 and both the chuck jaw body 42 and the chuck jaw tip 44, a mechanical interlock may be formed between these components. This mechanical interlock may be used in addition to the adhesive, or in place of the adhesive, if desired. More specifically, as shown in FIG. 6, a mechanical interlock is formed between the channel-shaped member 46 and the chuck jaw body 42 by forming a generally dovetail-shaped interface therebetween. This dovetail-shaped interface includes a seating surface 50 recessed within the chuck jaw body 42 that corresponds to the outer perimeter 52 of the channel-shaped member 46. The mechanical interlock securing the chuck tip 44 is preferably formed of a similar dovetail-shaped interface between a seating surface 54 recessed within the channel-shaped member 46 that corresponds to the outer periphery 56 of the chuck tip 44. While one example of corresponding shapes suitable for use as a mechanical interlock has been shown and described, it is contemplated that mechanical interlocks of other shapes may also be utilized, such as those with multiple dovetail-shaped interfaces or with interfaces of complementary teeth of other shapes.

An important feature of the present invention is the manner in which the chuck jaws 22 prevent electric current from being transferred from the drill bit 24 to the remainder of the drill 10. When the drill bit 24 is secured in position by the chuck jaws 22, as shown in FIGS. 1 and 2, the metal chuck jaw tips 44 of each jaw 22 are contacting the drill bit 24. Thus, any current that travels through the drill bit 24 (which is usually metal) will reach the chuck jaw tips 44. However, because each of the jaw tips 44 are completely insulated from its associated chuck jaw body 42 by its channel-shaped member 46, the electric current does not pass through to the chuck jaw body 42. Accordingly, the electric current does not pass through to the remainder of the drill 10. Thus, even if the operator makes contact with the metal sleeve 34 or metal chuck body 36 of the chuck assembly 20 while the drill bit 24 is conducting an electric current, the operator should not receive that current.

Turning now to FIGS. 7–10, a second preferred embodiment of the present insulated chuck jaws will now be described. For the sale of convenience, corresponding features of this embodiment have been given the same index numbers as those features of the first embodiment, with the addition of the prime symbol to each index number in the second embodiment.

In this embodiment, there is no channel-shaped insulating member (member 46 of the first embodiment). Instead, the entire chuck jaw body 42' is formed of an insulating material. Thus, the chuck tip 44', which is preferably formed of metal, is seated directly within the chuck jaw body 42'. Because the chuck jaw body 42' is formed of an insulating material, it prevents electric current from passing through the chuck jaw tip 44' to the remainder of the drill 10.

As in the first embodiment, the components of this second embodiment are preferably secured together with adhesive, or with a mechanical interlock, or both. More specifically, the mechanical interlock may include a generally dovetail-shaped interface between a seating surface 54' of the chuck body 42' and the outer periphery 56' of the chuck jaw tip 44'. Of course, other shapes for surfaces of the mechanical interlock are also contemplated.

In this embodiment, the chuck jaw tip 44', which is preferably made of metal, preferably extends for the full length of the chuck jaw body 42' to provide additional strength to the chuck jaw body 42', which is preferably made of plastic. However, if the chuck jaw body 42' can be made of a material of sufficient strength, while still providing the necessary insulating qualities, the chuck jaw tip 44' need not extend for the full length of the chuck jaw body 42', and instead, for example, may terminate at a point near the end of the cutaway portion 48'.

In operation, the second embodiment of the chuck jaw 22' provides the same beneficial insulating properties as the first embodiment. Thus, the insulating chuck jaw body 42' prevents current from being transferred from the chuck tip 44' to the remainder of the drill 10 (or other rotatable power tool).

While various embodiments of the present invention have been shown and described, it should be understood that other modifications, substitutions and alternatives may be apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A chuck jaw configured and arranged to be used in combination with other chuck jaws for securely retaining a rotatable accessory in position in a chuck assembly, said chuck jaw comprising:
   a chuck jaw body defining a generally longitudinal axis along the primary extension direction thereof;
   a chuck jaw tip positioned within said chuck jaw body and extending along at least a portion of said generally longitudinal axis of said chuck jaw body; and
   an insulating material for preventing electrical current from passing between the rotatable accessory and the remainder of the chuck assembly via said chuck jaw.

2. The chuck jaw as defined in claim 1 wherein said chuck jaw body is generally cylindrical-shaped and includes along a portion of the length thereof a cutaway portion that is configured and arranged for securely engaging an outer periphery of the rotatable accessory.

3. The chuck jaw as defined in claim 2 wherein said cutaway portion is peaked to form a generally V-shaped cross-section.

4. The chuck jaw as defined in claim 3 wherein said chuck jaw tip is positioned approximately at the intersection of the two legs of said generally V-shaped cross-section.

5. The chuck jaw as defined in claim 1 wherein said insulating material is generally channel-shaped and is positioned between said chuck jaw tip and said chuck jaw body for preventing communication of electrical current therebetween.

6. The chuck jaw as defined in claim 5 wherein said generally channel-shaped insulating material covers at least one longitudinal end surface of said chuck jaw tip.

7. The chuck jaw as defined in claim 5 wherein said chuck jaw tip and said chuck jaw body are both made of metal.

8. The chuck jaw as defined in claim 5 wherein said chuck jaw tip, said insulating material, and said chuck jaw body are mechanically interlocked to one another.

9. The chuck jaw as defined in claim 5 wherein said chuck jaw tip, said insulating material, and said chuck jaw body are adhesively bonded to one another.

10. The chuck jaw as defined in claim 1 wherein said chuck jaw tip is at least partially embedded within said insulating material such that said insulating material forms said chuck jaw body.

11. The chuck jaw as defined in claim 10 wherein said chuck jaw tip is made of metal.

12. The chuck jaw as defined in claim 10 wherein said chuck jaw tip and said chuck jaw body are mechanically interlocked together.

13. The chuck jaw as defined in claim 10 wherein said chuck jaw tip and said chuck jaw body are adhesively bonded together.

14. The chuck jaw as defined in claim 1 wherein said insulating material is chosen from one of the following materials: thermoplastic, thermoset, and ceramic.

15. The chuck jaw as defined in claim 1 wherein said insulating material is positioned between said chuck jaw tip and said chuck jaw body for preventing communication of electrical current therebetween.

16. A chuck assembly comprising:
   a chuck body configured to be attached to a rotatable shaft for rotation therewith; and
   a plurality of chuck jaws positioned within said chuck body, said plurality of chuck jaws being configured and arranged to cooperate with each other to securely retain a rotatable accessory in position within said chuck assembly for rotation with the rotatable shaft;
   wherein each of said chuck jaws includes:
      a chuck jaw body defining a generally longitudinal axis along the primary extension direction thereof;
      a chuck jaw tip positioned within said chuck jaw body and extending along at least a portion of said generally longitudinal axis of said chuck jaw body; and
      an insulating material for preventing electrical current from passing between the rotatable accessory and said chuck body via said chuck jaw.

17. The chuck assembly as defined in claim 16 wherein said insulating material is generally channel-shaped and is positioned between said chuck jaw tip and said chuck jaw body for preventing communication of electrical current therebetween.

18. The chuck assembly as defined in claim 16 wherein said chuck jaw tip is at least partially embedded within said insulating material such that said insulating material forms said chuck jaw body.

19. The chuck assembly as defined in claim 16 wherein said insulating material is positioned between said chuck jaw tip and said chuck jaw body for preventing communication of electrical current therebetween.

20. A rotatable power tool comprising:
   a motor;
   a rotatable shaft arranged to be driven by said motor;
   a chuck body configured to be attached to said rotatable shaft for rotation therewith; and
   a plurality of chuck jaws positioned within said chuck body, said plurality of chuck jaws being configured and arranged to cooperate with each other to securely retain a rotatable accessory in position within said chuck assembly for rotation with the rotatable shaft;
   wherein each of said chuck jaws includes:

a chuck jaw body defining a generally longitudinal axis along the primary extension direction thereof;

a chuck jaw tip positioned within said chuck jaw body and extending along at least a portion of said generally longitudinal axis of said chuck jaw body; and an insulating material for preventing electrical current from passing between the rotatable accessory and said chuck body via said chuck jaw.

21. The rotatable power tool as defined in claim 20 wherein said insulating material is generally channel-shaped and is positioned between said chuck jaw tip and said chuck jaw body for preventing communication of electrical current therebetween.

22. The rotatable power tool as defined in claim 20 wherein said chuck jaw tip is at least partially embedded within said insulating material such that said insulating material forms said chuck jaw body.

23. The rotatable power tool as defined in claim 20 wherein said insulating material is positioned between said chuck jaw tip and said chuck jaw body for preventing communication of electrical current therebetween.

\* \* \* \* \*